US012387007B2

(12) United States Patent
Monaco

(10) Patent No.: US 12,387,007 B2
(45) Date of Patent: Aug. 12, 2025

(54) PERSONALLY IDENTIFIABLE INFORMATION SCRUBBER WITH LANGUAGE MODELS

(71) Applicant: OpenAI Opco, LLC, San Francisco, CA (US)

(72) Inventor: John V. Monaco, Foster City, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 18/981,911

(22) Filed: Dec. 16, 2024

(65) Prior Publication Data
US 2025/0200222 A1 Jun. 19, 2025

Related U.S. Application Data

(60) Provisional application No. 63/610,586, filed on Dec. 15, 2023.

(51) Int. Cl.
G06F 21/62 (2013.01)
G06F 40/284 (2020.01)

(52) U.S. Cl.
CPC ........ G06F 21/6254 (2013.01); G06F 40/284 (2020.01)

(58) Field of Classification Search
CPC ................ G06F 21/6254; G06F 40/284
See application file for complete search history.

(56) References Cited

U.S. PATENT DOCUMENTS

| | | | | |
|---|---|---|---|---|
| 12,182,311 B1* | 12/2024 | Ardhanari | ........... | G06F 21/6254 |
| 12,198,028 B1* | 1/2025 | Alperin | ................. | G06F 16/909 |
| 12,265,788 B1* | 4/2025 | Fieldman | ............ | G06F 21/6218 |
| 12,266,107 B1* | 4/2025 | Vaidya | ................... | G16H 10/60 |
| 12,266,341 B1* | 4/2025 | Agrawal | ............... | G10L 13/027 |
| 2023/0137378 A1* | 5/2023 | LaTerza | .................. | G06F 40/40 726/26 |
| 2025/0086308 A1* | 3/2025 | Crume | .................... | G06N 5/025 |
| 2025/0103746 A1* | 3/2025 | Gharibi | ............... | G06F 21/6227 |
| 2025/0104824 A1* | 3/2025 | Cheng | .................... | G16H 20/00 |
| 2025/0111073 A1* | 4/2025 | Ho | ......................... | H04L 9/088 |
| 2025/0118286 A1* | 4/2025 | Badlani | ................... | G10L 25/18 |

* cited by examiner

Primary Examiner — Stephen T Gundry
(74) Attorney, Agent, or Firm — Finnegan, Henderson, Farabow Garrett & Dunner LLP

(57) ABSTRACT

Sanitizing data can be a cumbersome task, particularly when the volume of data is large, the content is sensitive, and/or the type of sanitation requires contextual determinations. Sanitizing large amounts of data is tedious and may often require highly trained personnel with clearances and/or other qualifications. In the systems and methods of the present disclosure, language models (LMs) are used to solve these and other technical issues with tools that may allow sanitizing data easily, with high versatility, context awareness, and/or low demand for computational resources. In particular, some of the disclosed systems and methods use a first language model and a second language model (being less resource-intensive than the first language model) to generate sanitized output data with improved efficiency and accuracy. This dual-model approach ensures that sensitive information is handled appropriately while optimizing computer resource usage.

20 Claims, 8 Drawing Sheets

| Category | Description |
| --- | --- |
| private_person | Names or identities of private individuals. |
| private_url | URLs that may contain sensitive or private information. |
| private_phone | Phone numbers that are private or sensitive |
| private_email | Email addresses that should be kept private. |
| private_address | Physical addresses that are private or sensitive. |
| account_number | Account numbers (e.g., bank or service accounts). |
| credential | Passwords, API keys, and other text that may control access. |
| public_person | Names or identities of public figures or celebrities. |
| fiction_person | Names or identities of fictional characters. |
| organization | Names of companies, institutions, or organizations. |
| public_email | Email addresses that are public and non-sensitive. |
| public_address | Physical addresses that are public and non-sensitive. |
| public_phone | Phone numbers that are public and non-sensitive. |
| public_url | URLs that are public and non-sensitive. |

FIG. 3

PERSONALLY IDENTIFIABLE INFORMATION SCRUBBER WITH LANGUAGE MODELS

This application claims priority to U.S. Provisional Patent Application No. 63/610,586, filed Dec. 15, 2023, the entire contents of which is hereby incorporated by reference in their entirety.

FIELD OF DISCLOSURE

The disclosed embodiments generally relate to systems, devices, methods, and computer readable media for interacting and using language models in computer environments. More specifically, and without limitation, this disclosure relates to systems and methods that sanitize documents containing personally identifiable information (PII) using large machine language models.

BACKGROUND

Language models (LMs) can perform a variety of natural language processing (NLP) tasks. LMs can be trained using large datasets to perform tasks such as recognizing, translating, predicting, or generating text or other content.

However, conventional LMs can lack sufficient accuracy at identifying PII to perform the task of sanitizing text containing PII. As a result, the identification, removal, tokenization, obfuscation, or other sanitization of the text may be underinclusive or overinclusive.

Furthermore, conventional LMs can be computationally demanding, potentially hindering the use of such LMs for identification, removal, or obfuscation of PII. This can result in unacceptable delays and limited throughput when sanitizing information containing PII.

The disclosed systems, apparatuses, devices, and methods are directed to overcoming these and other drawbacks of existing systems and for improved systems and methods for PII scrubbers with LMs, other machine learning (ML) methods, and/or other artificial intelligence (AI) models.

SUMMARY

The disclosed embodiments provide technical improvements that address technical problems arising in the context of sanitizing text containing PII using LMs.

For example, some aspects of the present disclosure are directed to improving computer-implemented systems of data sanitization. Sanitizing data, also known as data anonymization or data scrubbing, can be a cumbersome task. Particularly when the volume of data is large, the content is sensitive, and/or the type of sanitation require contextual determinations. Sanitizing large amounts of data is tedious and may often require highly trained personnel with clearances and/or other qualifications.

In the systems and methods of the present disclosure LMs are used to solve these and other technical issues with tools, systems, and/or methods that may allow sanitizing data easily, with high versatility, context awareness, and/or low demand for computational resources. In particular, some embodiments of the discloses systems and methods may use multiple LMs that operate in conjunction to enable specifically tailored models that are more efficient in data sanitization, having improved performance and lower computer resource demands, but keeping ability of contextual determinations and versatility for different applications.

For example, in some of the disclosed systems multiple LMs models get configured to perform tasks that more efficiently sanitize PII in large datasets. The disclosed systems of PII sanitation may include first and second LMs. The first and second LMs may be configured with specific purposes, be trained with specific datasets, and the performance of the first or second LM can be fine-tuned. Such fine-tuning can adapt the first or second LM to a particular context, improving accuracy in PII detection, scrubbing, and error handling in that particular context. Similarly, such fine-tuning can adapt the first or second LM to a particular task (e.g., identifying a particular category or categories of PII). Furthermore, fine tuning can reduce the occurrences of false positives or false negatives, improve the model's reliability, reduce data mishandling, and reduce the need for user intervention to correct any mislabeling. Overall, such fine-tuning can enhance the adaptability of text sanitization systems and methods consistent with disclosed embodiments, enabling such systems and methods to better handle diverse user-provided data sources and contexts.

The disclosed systems and their configuration resolve technical problems of data sanitization using LMs that are specifically configured to perform the tasks more efficiently and accurately. The disclosed systems, thus, improve the technical field of data privacy protection and PII scrubbing. For example, the disclosed systems of data sanitization can enable more accurate, automated text, audio, or video sanitization. Such automated sanitization can be used for regulatory compliance purposes, industry handling of sensitive consumer data, and/or mitigating the risks of breaches or unauthorized access to personal information. Automated text sanitization can replace error-prone manual text sanitization and can be deployed far more extensively than manual text sanitization. Unlike manual text sanitization, automated text sanitization enhances accuracy by reducing the errors associated with human oversight by leveraging advanced language models, enables scalability which allows for more extensive deployment across diverse datasets, and accelerates sanitization by providing an efficient and reliable alternative to conventional manual methods. Further, the disclosed systems for PII sanitization can be more accurate than other computer-implemented systems that base sanitization on keywords or formats (e.g., a social security format) to identify PII for sanitization. For example, some of the disclosed systems may not only use keywords or formats to identify PII instead also evaluating context and intent in documents. Thus, the disclosed systems can improve the field of automated detection of PII by, instead of identifying PII with fixed parameters, use more accurate and adaptable methods that evaluate surrounding context.

Some aspects of the present disclosure may include a system for data sanitization. The system may be configured with operations such as obtaining a first language model using, training data including PII, and ground truth labels corresponding to the training data—the ground truth labels can identify the PII included in the training data. The system can refine or retrain the first language model, so it is configured to sanitize text data. This training can use the obtained training data and the ground truth labels. The second language model may be trained to sanitize text data but leveraging the first language model so that the second language model can be configured to be less resource-intensive than the first language model. These two language models can be then setup for PII scrubbing. For example, the system may be configured to perform operations like obtaining input documents including PII and private PII and generating sanitized output data using the second language model and the input data.

Another aspect of the present disclosure is directed to a computer-implemented method for text sanitization. The computer-implemented method can be performed in computer systems configured with AI capabilities, such as systems designed for both training and inference operations. These systems may include specialized hardware like GPUs and TPUs to accelerate the processing of large datasets and complex algorithms. Additionally, they may be equipped with software frameworks and libraries that support machine learning and deep learning tasks, enabling efficient model development, deployment, and real-time data analysis.

The disclosed computer-implemented method may include operations such as (without a specific order):
- obtaining and/or initializing a first language model trained to sanitize text data, the first language model may be trained using training data including PII and ground truth labels corresponding to the training data.
- training and/or configuring a second language model using the first language model to sanitize text data, the second language model being configured to be less resource-intensive than the first language model.
- obtaining and/or receiving input data (text, audio, or video data) including PII and private PII.
- generating sanitized output text data using the second language model and the input data.

Another aspect of the present disclosure is directed to a non-transitory computer-readable medium that may contain instructions (e.g., programming instructions). The instructions in this medium can configure a computer system or a processor to perform operations for text sanitization. The operations can include obtaining and/or initializing a first language model using training data. The training data can include, for example, PII and ground truth labels corresponding to the training data—e.g., with the ground truth labels identifying the PII included in the training data. The operations can also include training of a first language model to sanitize text data using the training data and the ground truth labels and training of a second language model using the first language model, to sanitize text data. The second language model being configured to be less resource-intensive than the first language model. The medium's instructions can also configure operations for obtaining or retrieving input documents including PII and private PII (e.g., via an interface, which can be a graphical user interface or GUI, or an application programming interface or API) and generating sanitized output data using the second language model and the input text data, where the sanitized output including modified versions of at least a portion of the PII.

Other systems, methods, and computer networking apparatuses are also discussed within this disclosure.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 depicts an example of PII suitable for sanitization using an LLM, consistent with disclosed embodiments.

DETAILED DESCRIPTION

Figure 1:
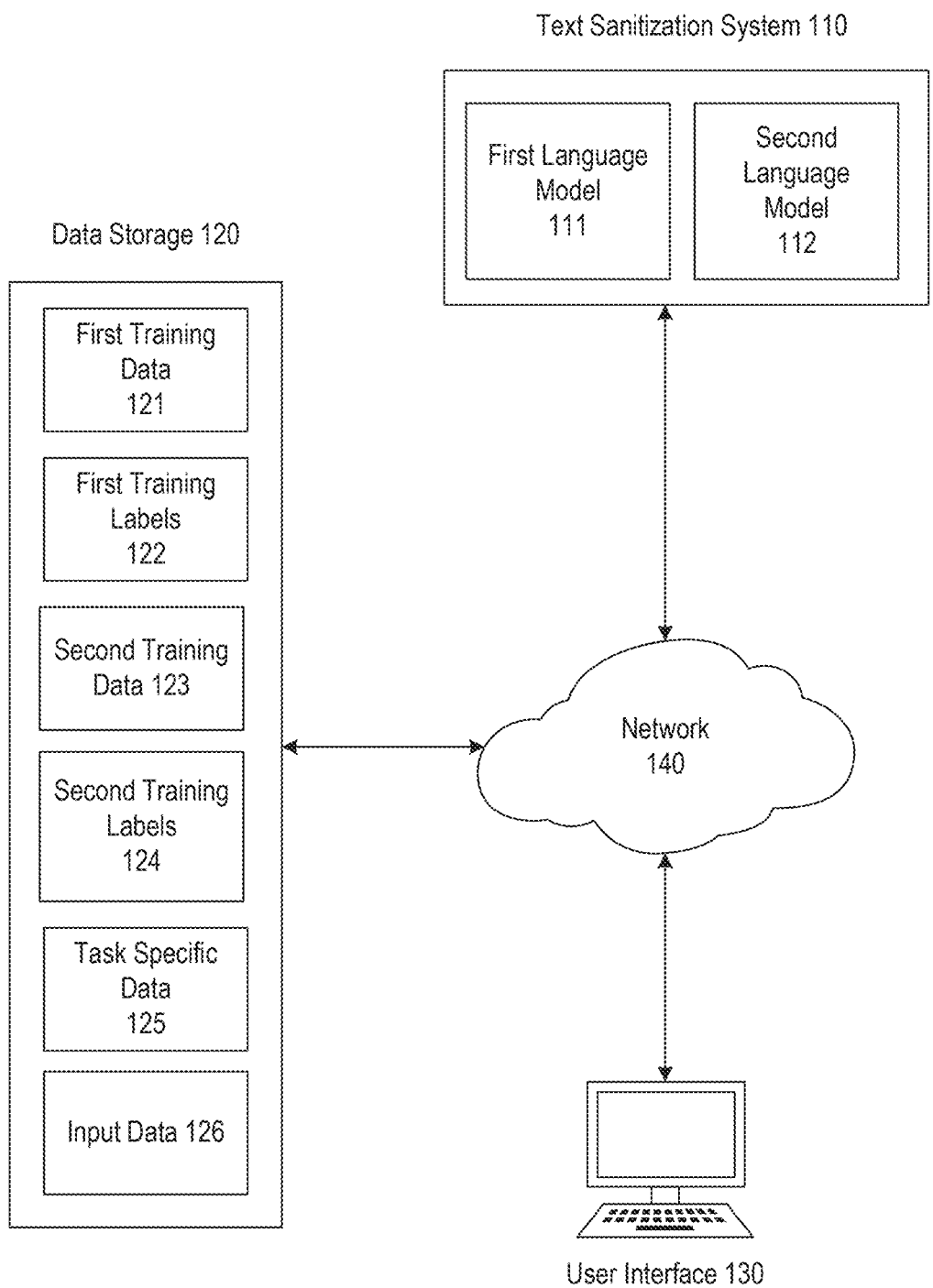
FIG. 1 depicts a block diagram of an example of a data processing flow, consistent with disclosed embodiments.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

Sanitizing data, also known as data anonymization or data scrubbing, can be a cumbersome task. Particularly when the volume of data is large, the content is sensitive, and/or the type of sanitation require contextual determinations. Sanitizing large amounts of data is tedious and may often require highly trained personnel with clearances and/or other qualifications. Some computing programs have been used for sanitizing data by, for example, searching and sanitizing text using keywords or format templates. But these type of software-based solutions frequently have technical issues like lack of versatility (e.g., only being able to identify specific keywords), are computationally expensive (e.g., based on comparing text with databases), and/or have limited applicability.

In the systems and methods of the present disclosure LMs are used to solve these and other technical issues with tools, systems, and/or methods that may allow sanitizing data easily, with high versatility, context awareness, and/or low demand for computational resources. In particular, some embodiments of the discloses systems and methods may use multiple LMs that operate in conjunction to enable specifically tailored models that are more efficient in data sanitization having improved performance but keeping ability of contextual determinations and versatility for different applications.

For example, in the disclosed systems and methods, a system of PII sanitation may include a first and second LMs. The first and second LMs may be configured with specific purposes, be trained with specific datasets. Further, the first and second LMs may be configured so the performance can be fine-tuned. Such fine-tuning can adapt the first or second LLM to a particular context, improving accuracy in PII detection, scrubbing, and error handling in that particular context. Similarly, such fine-tuning can adapt the first or second LLM to a particular task (e.g., identifying a particular category or categories of PII). Furthermore, fine tuning can reduce the occurrences of false positives or false negatives, improve the model's reliability, reduce data mishandling, and reduce the need for manual user intervention to correct any mislabeling. Overall, such fine-tuning can enhance the adaptability of text sanitization systems and methods consistent with disclosed embodiments, enabling such systems and methods to better handle diverse user-provided data sources and contexts.

The disclosed embodiments constitute improvements in the technical field of natural language processing (NLP) and computer resource management in systems supporting LMs. Systems and methods consistent with disclosed embodiments can consider context and indicia of user intent when sanitizing text, achieving more accurate PII recognition and thereby improving the handling of sensitive and confidential data. Furthermore, the disclosed systems and method can provide accurate PII recognition using less-resource-intensive LLMs, thereby supporting scalable and resource-efficient NLP applications.

The disclosed embodiments constitute improvements in the technical field of data privacy protection. Systems and methods consistent with disclosed embodiments can enable more accurate, automated text sanitization. Such automated text sanitization can be used for regulatory compliance purposes, industry handling of sensitive consumer data, and/or mitigating the risks of breaches or unauthorized access to personal information. Automated text sanitization can replace error-prone manual text sanitization and can be deployed far more extensively than manual text sanitization. Unlike manual text sanitization, automated text sanitization enhances accuracy by reducing the errors associated with human oversight by leveraging advanced language models, enables scalability which allows for more extensive deployment across diverse datasets, and accelerates sanitization by providing an efficient and reliable alternative to conventional manual methods.

Consistent with disclosed embodiments, PII can include data usable to identify an individual. PII can include an individual's name, date of birth, identification number (e.g., social security or national identification number, driver's license number, passport number or the like), contact information (e.g., phone number, email address, postal address, URL, or the like), account information (e.g., bank account information, insurance account information, brokerage account information, customer service account information, or the like), credentials (e.g., passwords, API keys, or the like), medical information (medical records, immunization records, medical bills, treatment information), employment information (e.g., employer, job title, employee id number, employment location, or the like), education information (e.g., degree, graduation year, school, or the like), legal information (e.g. criminal record information, tax information, child support information, or the like), biometric data (e.g., fingerprint, gait, facial, voiceprint, or the like), identity-associated device information (e.g. MAC address, IP address, device name, or the like), or location data.

PII can be public PII or private PII. Public PII can include PII pertaining to fictional characters (e.g., the name and address of Harry Potter). Public PII can also include certain PII pertaining to public figures or legal persons (e.g., companies, institutions, organizations, or the like). For example, the name, corporate address, corporate webpage, and corporate contact information for a company may constitute public PII, while a bank account number or tax identification number for the company may constitute private PII. As an additional example, the name and birth date of a celebrity may constitute public PII, while the medical information, legal information, personal address, or personal cell phone number of the celebrity may constitute private PII.

Consistent with disclosed embodiments, sanitizing text may include redacting, tagging, masking, replacing, anonymizing, obfuscating, encrypting, or the like PII in the text. Sanitizing text, particularly in large volumes or with intricate conditions or parameters, can be a cumbersome task that cannot be practically performed with regular tools. For example, sanitizing large quantities of text cannot be practically performed by humans as it would require frequent evaluation and/or specialized training. Additionally, sanitizing text with algorithms is complicated and/or computationally expensive because sanitizing text frequently requires determining sanitation based on context. Information that may not be considered PII in one context, may be considered PII in a different context. This context characterization makes it difficult and/or computationally expensive for traditional algorithms to perform efficient and accurate text sanitation because it would require complex comparative databases and/or multiple rounds of redactions and/or checks. For example, it may be improper to sanitize text based on simple signs or formats because without context awareness the algorithm may miss sanitation and/or over sanitize. Disclosed systems and methods address these technical issues. As may be appreciated, an LM can sanitize input text by generating corresponding output text that redacts, tags, masks, replaces, anonymizes, obfuscates, encrypts, or the like PII in the input text. As depicted herein, the output text may preferably be identical to the input text, apart from the redaction, tagging, masking, replacement, anonymization, obfuscation, encryption, or the like.

The disclosed embodiments address technical problems associated with sanitizing text using LMs. The disclosed embodiments can improve the accuracy, efficiency, and trainability of LMs used to sanitize documents. LMs consistent with disclosed embodiments can more accurately identify PII, distinguish between private PII and public PII, and sanitize text in accordance with user needs. Furthermore, consistent with disclosed embodiments, a first LM can be trained to sanitize documents. The first LM can then be used to train a second, less-resource-intensive LM to sanitize documents. This multi-model, multi-step training process can enable the second LM to at least approach the document-sanitization performance of the first LM while using fewer resources than the first LM in performing the task. For example, the second LM can reduce response times and reduce resource requirements, which enables broader use of this beneficial, data-privacy-enhancing technology.

Illustrative embodiments of the present disclosure are described below.

FIG. 1 depicts a block diagram of an example of a data processing flow, illustrating the interaction between various aspects of this disclosure, according to some embodiments of the present disclosure. The system 100 may include network 140, which facilitates communication and sharing of information between the user interface 130, text sanitization system 110, and data storage 120. Network 140 may be any type of network that provides communications, exchanges information, and/or facilitates the exchange of information. For example, network 140 may be the Internet, a Local Area Network, a cellular network, a public switched telephone network ("PSTN"), or other suitable connection(s) that enables transmission of information between the components of the system. Network 140 may support a variety of electronic messaging formats and may further support a variety of services and applications for mobile devices.

Additionally, or alternatively, network 140 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In some systems, user interface 130 and text sanitization system 110 may connect and communicate through a direct communications network. In other systems, instead of user interface 130, the system may use an application programming interface (API) to communicate input data, output data, and/or information for PII scrubbing (e.g., PII tags, or parameters). Systems and methods for integrating application programming interface (APIs) with language models have been described in commonly assigned U.S. Pat. No. 12,124,823, titled "Schema-based integration of external APIs with natural language applications," which issued Oct. 22, 2024, and is incorporated by reference in its entirety.

Data storage 120 may use various storage engines. For example, a data storage engine may include at least one of distributed file systems, cloud-based storage, distributed databases, relational databases, data warehouses, in-memory databases, NoSQL databases, object databases, distributed file and object stores, document stores, time-series databases, key-value stores, column-family stores, hybrid storage systems, and content delivery networks.

The system 100 may further include first language model 111. First language model 111 may be at least one of a natural language processing model, generative model, or a multimodal model. Further, using network 140, first language model 111 can apply at least portions of datasets stored in data storage 120. First language model 111 may also be trained using first training data 121 and/or first training labels 122. First training data 121 may include structured datasets with labeled instances of public and private PII or may include unstructured text that contains examples of private or public PII. First training labels 122 may include the ground truth labels for the first training data 121. The ground truth labels being the true labels or annotations assigned to the training data, which serve as the correct reference against the models' predictions. For example, the ground truth labels can identify the public PII and the private PII included in the first training data and be compared against the model's first training labels.

The system 100 may further include second language model 112. Second language model 112 may be at least one of a natural language processing model, generative model, or a multimodal model. Second language model 112 can be distilled from first language model 111 by transferring the knowledge and capabilities of first language model 111, the knowledge and capabilities including but not limited to, first training data 121, first training labels 122, and task specific data 125. Second language model 112 can be trained using second training data 123 and/or second training labels 124. Second training data 123 may include structured datasets with labeled instances of public and private PII or may include unstructured text that contains examples of private or public PII. Second training labels 124 may include the ground truth labels for second training data 123. Task specific data 125 may include, but is not limited to, labeled datasets where private and public PII has been labeled, ground truth labels associated with the labeled dataset, task objectives guiding the model in learning how to recognize and classify PII, or fine-tuning objectives which may involve adjusting model parameters and loss functions to align model predictions with ground truth labels for PII.

In some of the disclosed systems, second language model 112 may receive input data 126. For example, the second language model may receive input data 126 through user interface 130, API endpoints, file uploads, real-time streaming, data feeds, cloud storage, email or communication channels, or the like. The input text data may include text data in the form of a sentence, a phrase, a paragraph, or any combination of characters. Input text data 126 may include computer code. Input text data 126 may also include an input text prompt. Additionally, or alternatively, input text data 126 may be formed with a null set (e.g., having no input text data or no natural language input).

Figure 2:
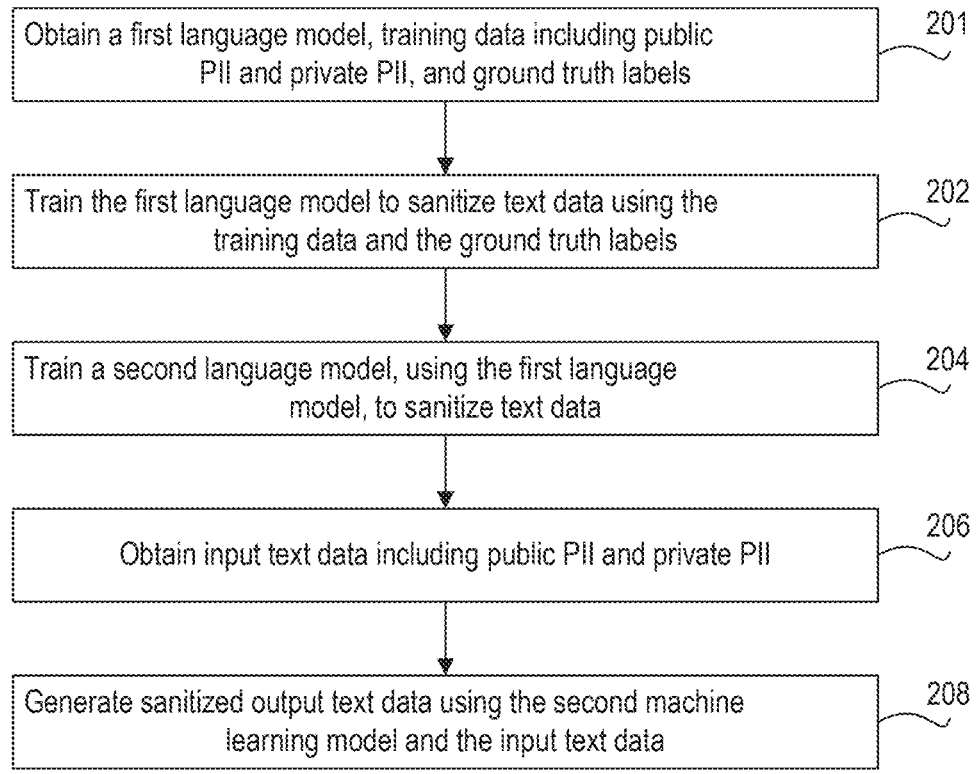
FIG. 2 depicts a flowchart of an example of a method for developing a large language model driven PII scrubber through a series of steps, consistent with disclosed embodiments.

FIG. 2 is a flowchart of an example of a computer-implemented method 200 for developing a large language model driven PII scrubber through a series of steps according to some embodiments of the present disclosure. The process shown in FIG. 2 or any of its constituent steps may be implemented using systems in FIG. 1, 7 or 8, or any component thereof. The steps illustrated in FIG. 2 are only examples, and in various embodiments steps may be added, merged, divided, duplicated, repeated (e.g., as part of a ML process), modified, performed sequentially, performed in parallel, and/or deleted.

At 201, the computer-implemented method may obtain a first language model, training data including public PII and private PII, and ground truth labels corresponding to the training data. The ground truth labels can, for example, identify the public PII and the private PII included in the training data. Training data may include datasets, prompts from prompt engineering, or task specific data. Task specific data may include, but is not limited to, labeled datasets where private and public PII has been labeled, ground truth labels associated with the labeled dataset, task objectives guiding the model in learning how to recognize and classify PII, or fine-tuning objectives which may involve adjusting model parameters and loss functions to align model predictions with ground truth labels for PII.

At 202, the computer-implemented method may include training the first language model to sanitize text data using the training data and the ground truth labels. For example, the knowledge and capabilities of the first language model may be transferred to the second language model to train the second language model to sanitize input text data of PII. The knowledge and capabilities may include, but are not limited to the first language model's: labeled dataset with PII tags;

understanding of language, grammar, syntax, and vocabulary; semantic knowledge, understanding meanings of words, context, and relationships between words; commonsense knowledge; worldly knowledge; text generation skills related to various NLP tasks; attention mechanisms as to how to focus on relevant parts of input text data; contextual comprehension to apprehend and utilize context clues; learning strategies such as knowledge distillation, parameter sharing, and fine-tuning; training data processing, knowledge of processing and tokenizing text data; and performance heuristics, knowledge of performance optimization and hyperparameter tuning strategies. The knowledge and capabilities are transferred by adjusting the internal parameters and architecture of the second language model to align with the learned behavior of the first model.

At 204, the computer-implemented method may further use the first language model to train a second language model to sanitize text data. For example, the second language model may be configured to be less resource intensive than the first language model. The second language model may be less resource intensive as a result of numerous factors: the second language model being a number of parameters less than the number of parameters of the first language model; the second language model may require less computational power than the first language model; the second language model may have faster inference times than the first language model; the second language model may require less infrastructure and operational costs than the first language model; and/or the second language model may experience higher scalability than the first language model.

At 206, the computer-implemented method may further include obtaining input text data including public PII and private PII. Input data may include text data in the form of a sentence, a phrase, a paragraph, or any combination of characters. Input data may include computer code. Additionally, or alternatively, input data may be formed with a null set (e.g., having no natural language output). Moreover, input data may include audio or video data. And the input data may include multiple documents formats (e.g., .doc, .pdf, .xls, .mp4, .wmv etc.). At 206, the computer-implemented method may perform operations to convert, transcribe, or transform input data that is received or obtained in non-text form. For example, the system may be configured to use transformer models trained to transcribe or translate audio or video data. Additionally, the disclosed systems can be configured to system to process multi-modal inputs, such as scanned documents, spreadsheets, audio files, and multimedia files, converting them into text. Systems and methods for transforming audio, video, or general multimedia data to text have been described in the commonly assigned U.S. Pat. No. 12,079,587, titled "Multi-task automatic speech recognition system," which issued Sep. 3, 2024, and is incorporated by reference in its entirety. Further, the second language model may also be configured to tokenize the input data.

At 208, the second language model may generate sanitized output text data using the second language model and the input text data. Generating a sanitized output may include redacting the private PII based on private PII tags. For example, computer-implemented method 200 may include performing bulk sanitization in which the computing system may access a database (e.g., stored in data storage 120, or in another suitable system) containing various types of records, retrieve the data within the database, and sanitize the PII identified in the data using the second language model.

PII tags may include markup language tags, PII classification token, annotations, specific formatting, color coding, masking, brackets, parentheses, or watermarking. For example, markup language tags can enclose identified PII or PII classification tags can replace identified PII. Example categories of private PII can include, but are not limited to, identities of individuals, URLs, phone numbers, email addresses, physical addresses, account numbers, passwords, or API keys. PII tags may correspond to private or public categories of PII. For example, a phone number tag can correspond to an identified phone number, or a physical address tag can correspond to an identified physical address. The output may include data in the form of a sentence, a phrase, a paragraph, or any combination of characters. Alternatively, the output may include computer code. Additionally, the output may be formed with a null set (e.g., having no natural language output). The output may sanitize the input data by redacting, tagging, masking, replacing, anonymizing, obfuscating, or encrypting PII identified in the input data. The disclosed systems may generate the output that sanitized input by redacting, tagging, masking, replacing, anonymizing, obfuscating, encrypting, the content associated with the specific formatting from the PII tags. For example, the disclosed systems may be configured to use algorithms that identify the specific formatting associated with the PII (e.g., brackets as shown in FIG. 4) and perform operations to generate the sanitized output by modifying the text within the specific formatting (e.g., changing any character within the brackets to 'x').

FIG. 3 is a diagram of an example of private PII that a large language model may identify. The private categories 300 of PII tags may include names or identities of private individuals 302, URLs that may contain sensitive or private information 304, phone numbers that are private or sensitive 306, email addresses that should be kept private 308, physical addresses that are private or sensitive 310, account numbers such as bank or service accounts that are sensitive 312, and passwords, API keys, and other text that may control access 314.

Public categories of PII, are distinguished from the private categories of PII, may include names or identities of public figures or celebrities 316; names or identities of fictional characters 318; names of companies, institutions, or organizations 320; email addresses that are public and non-sensitive 322; physical addresses that are public and non-sensitive 324; phone numbers that are public and non-sensitive 326; or URLs that are public and non-sensitive 328.

Figure 4:
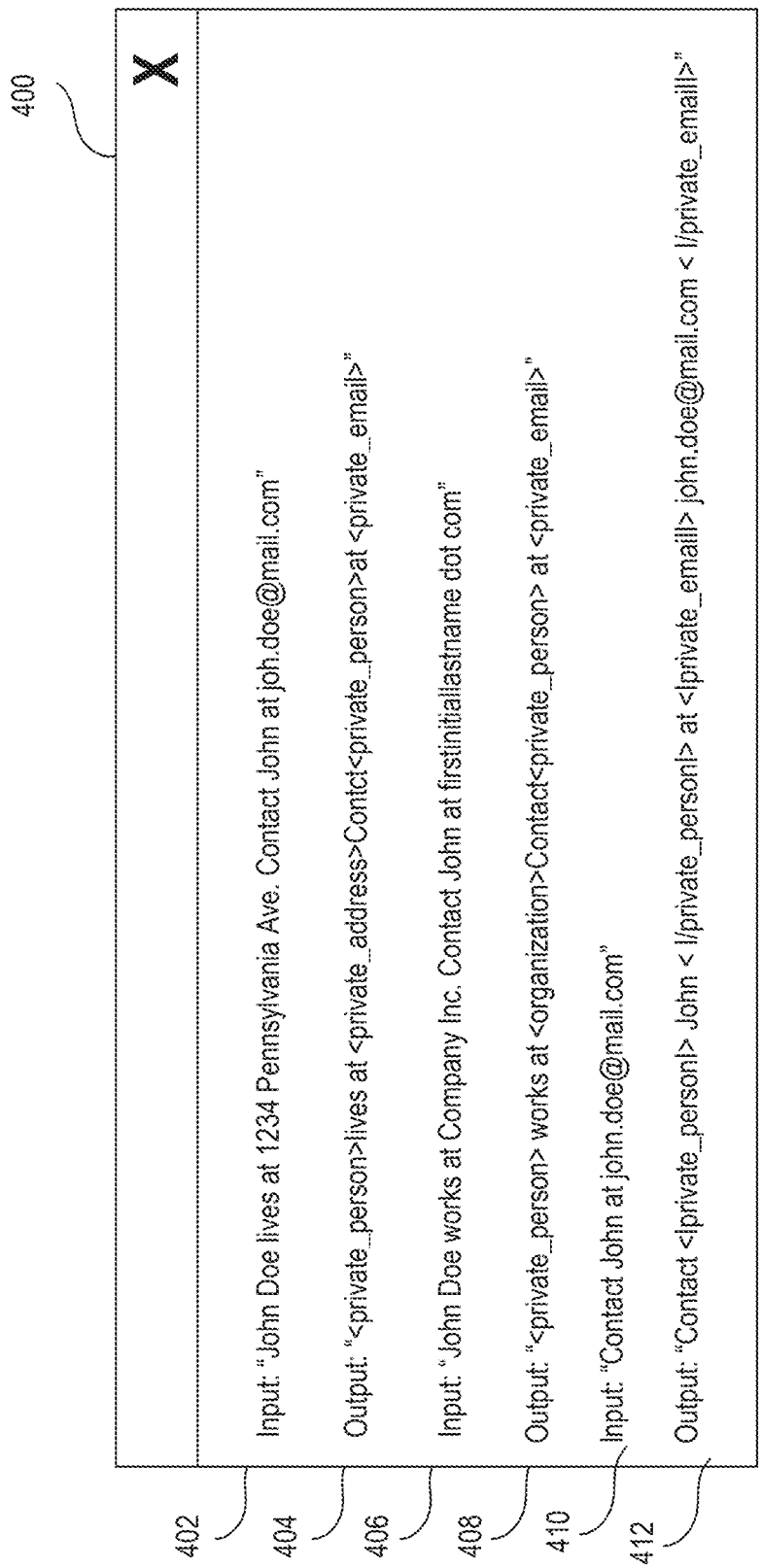
FIG. 4 depicts an example of a user interface suitable to accept input text data and generate sanitized output, consistent with disclosed embodiments.

FIG. 4 is an example of a diagram illustrating user interface 400 accepting input text data and generating a sanitized output. For instance, at 402, where the user text input states, "John Doe lives at 1234 Pennsylvania Ave, Contact John at john.doe@mail.com," the model output may state, "<private_person> lives at <private_address> Contact <private_person> at <private_email>." As a further example, if the input text data states, "John Doe works at Company Inc. Contact John at firstinitiallastname dot com," the model output may state, "<private_person> works at <organization> Contact <private_person> at <private_email>." In other embodiments, where the input text data states, "Contact John at john.doe@mail.com," the model output may state, "Contact <|private_person|> John <|/private_person|> at <|private_email|> john.doe@mail.com <|/private_email|>."

Figure 5:
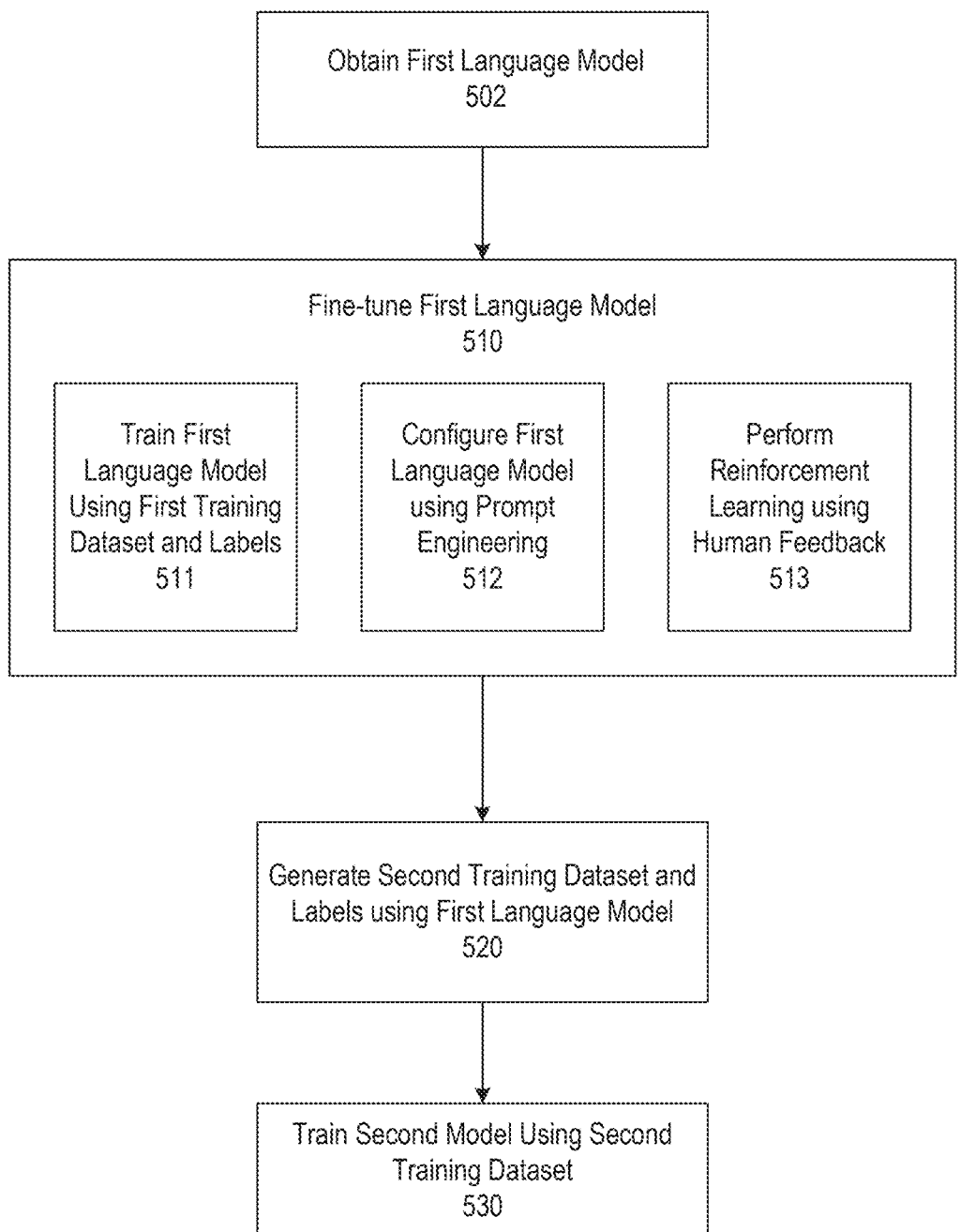
FIG. 5 depicts a flowchart illustrating an example of a process for training the second language model to sanitize input text data.

FIG. 5 is a flowchart illustrating an example process 500 for training the second language model to sanitize input text data. Process 500 may include obtaining a base or first language model (at 502). Process 500 may further include fine-tuning the first language model (at 510). Fine-tuning the first language model at 510 may involve training the first language model using the training data set and labels, at 511, configuring the first language model using prompt engineering, at 512, and/or performing reinforcement learning, at 513.

At 511, training the first language model using first training dataset and labels can include calculating a loss value between the first language model's labeled training data and corresponding ground truth labels. Calculating the loss value may include but is not limited to the following loss functions: cross-entropy loss, mean squared error loss, categorical cross-entropy loss, binary cross-entropy loss, hinge loss, Kullback-Leibler divergence, focal loss, custom loss functions, and regularization terms.

In some of the disclosed systems, the calculated loss value may be minimized by updating the first language model's parameters, where the loss value represents the disparity between the model's predictions for PII recognition within text data and the corresponding ground truth labels for PII presence or absence. Model parameters may include model weights, model biases, or layer-specific parameters. Optimization algorithms and techniques may indicate how model parameters, such as model weights, model biases, or layer-specific parameters, should be adjusted, and may update such parameters, to reduce the loss value. Updating the first model's parameters may involve one of the following optimization algorithms and techniques: gradient descent, stochastic gradient descent, mini-bath gradient descent, momentum, adaptive optimization algorithm, root mean square propagation, Adagard, custom optimization strategies, or regularization techniques.

At 512, fine-tuning the first language model can additionally or alternatively include using prompt engineering to fine-tune the first language model. The prompts used may include but are not limited to task specific prompts, explicit labeling instructions, negative prompts, contextual prompts, adversarial prompts, data augmentation prompts, and real-world scenario prompts.

At 513, fine-tuning the first language model can additionally or alternatively include performing reinforcement learning. For example, reinforcement learning using human feedback can be used for fine-tuning a language model. In reinforcement learning using human feedback annotators review the first language model's output and providing feedback to the model. Annotators may provide feedback by assigning reward scores to model outputs indicating the accuracy of the model's responses, assigning penalty scores for incorrect model outputs, ranking multiple model-generated responses based on their accuracy, providing textual comments or explanations alongside model outputs indicating specific issues, errors, or areas of improvement, highlighting or tagging specific portions of the model's output that are incorrect and providing detailed feedback on what needs improvements, suggesting corrections to the model's outputs, explaining why particular PII tagging is incorrect and providing context and guidance for improvement, or by providing additional training examples containing additional labeled data.

At 520, the process may further include generating second training dataset and labels using the first language model, and, at 530, training the second model using second the training dataset. For example, as further discussed in connection with FIG. 2, at 530 process 500 may involve a method for developing or training models using additional datasets for sanitize data.

Figure 6:
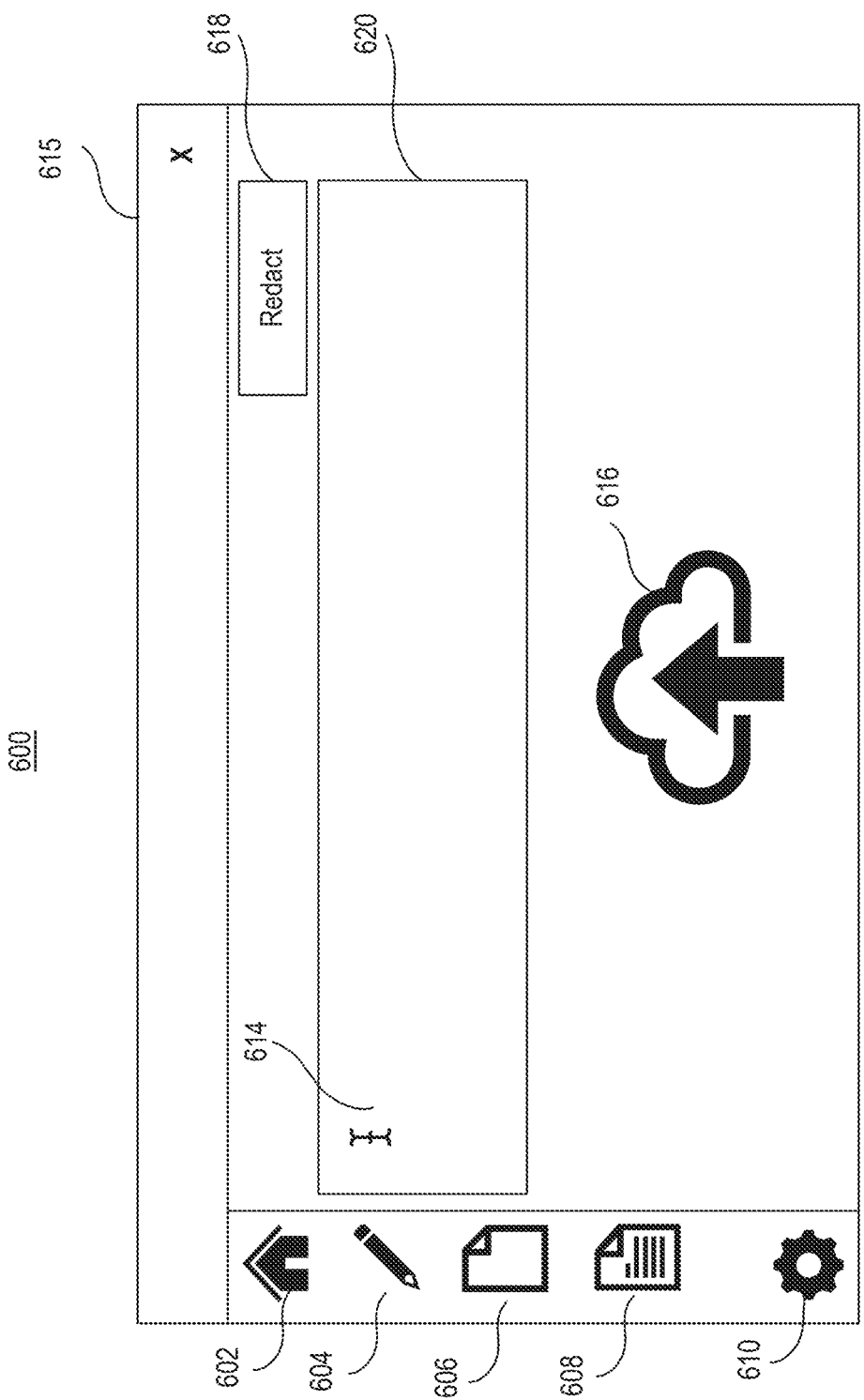
FIG. 6 depicts an example of a user interface suitable for implementing various aspects of the disclosed embodiments, according to some embodiments of the present disclosure.

FIG. 6 is an example diagram illustrating a user interface 600 for implementing various aspects of this disclosure, according to some embodiments of the present disclosure. User interface 600 may include at least one dialog box or pop-up 615. The user interface 600 may include at least one input field 620 for users to input their text input 614. User interface 600 may include an upload button 616 for users to upload their input text data. User interface 600 may also include a button that initiates the output generation by the model 618 based on the input text data. Further, user interface 600 may include a home button 602, an edit button 604, and/or a button to allow users to insert or upload new input text data 606. User interface 600 may include a button to view existing generated outputs made by the second language model 608. Further, user interface 600 may include a settings button 610 for users to specify their desired output preferences.

Figure 7:
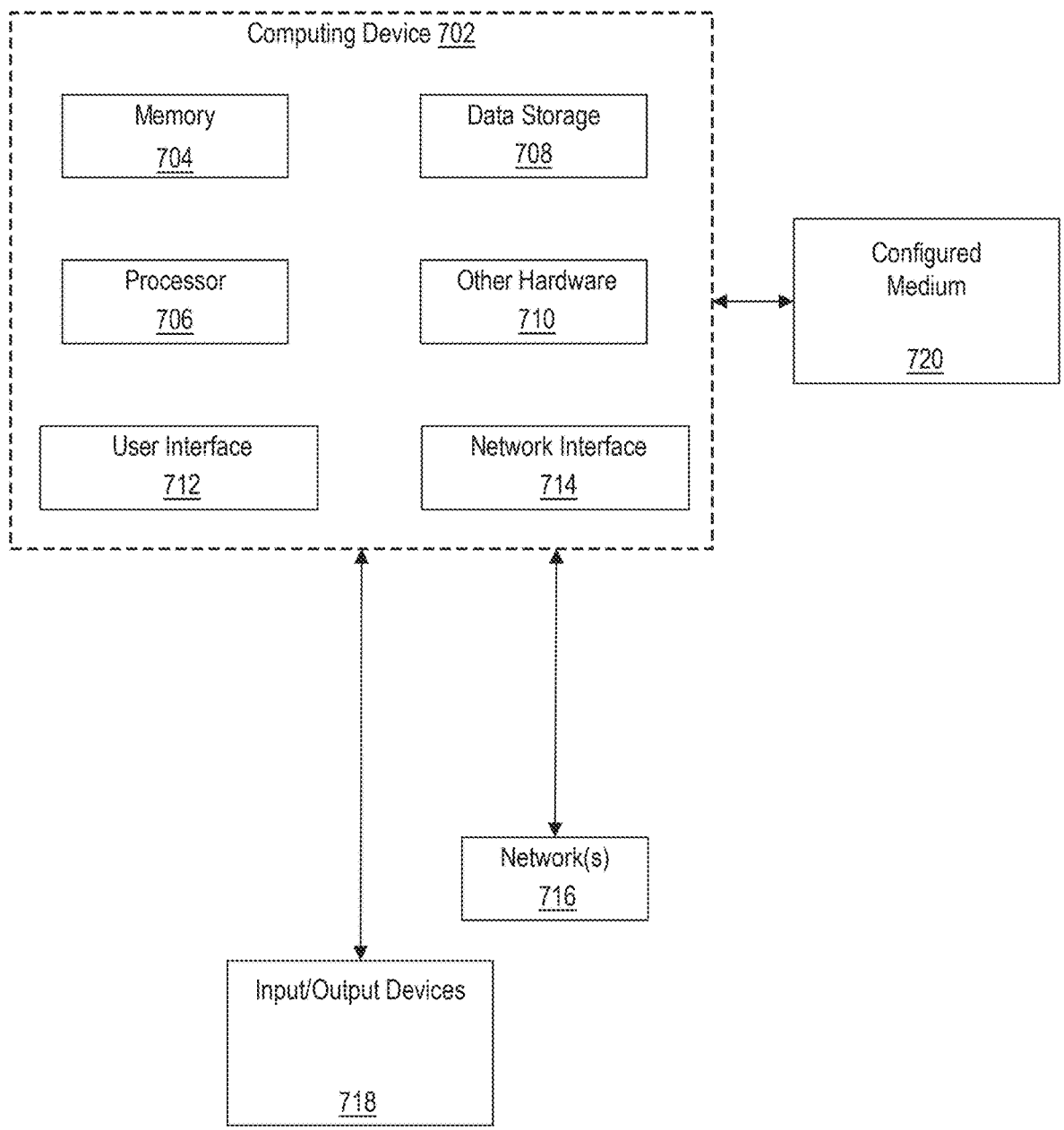
FIG. 7 depicts a block diagram of an example of an operating environment for implementing various aspects of the disclosed embodiments, according to some embodiments of the present disclosure.

An example operating environment for implementing various aspects of this disclosure is illustrated in FIG. 7. As illustrated in FIG. 7, exemplary operating environment 700 may include computing device 702 (e.g., a general-purpose computing device) in the form of a computer. Computing device 702 may be associated with a user. Components of computing device 702 may include, but are not limited to, various hardware components, such as one or more processors 706, data storage 708, system memory 704, other hardware 710, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 7, operating environment 700 for an exemplary embodiment includes at least one computing device 702. Computing device 702 may be a uniprocessor or multiprocessor computing device. Operating environment 700 may include one or more computing devices (e.g., multiple computing devices 702) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 702 may be configured for end-users, e.g., with applications, for administrators, as a server, as a distributed processing node, as a special-purpose processing device, or otherwise configured to train machine learning models and/or use machine learning models. In some embodiments, multiple computing devices 702 (e.g., a network of GPUs) may be configured to train a machine learning model.

One or more users may interact with the computer system including one or more computing devices 702 by using a display, keyboard, mouse, microphone, touchpad, camera, sensor (e.g., touch sensor) and other input/output devices 718, via typed text, touch, voice, movement, computer vision, gestures, and/or other forms of input/output. Input/output device 718 may be removable (e.g., a connectable mouse or keyboard) or may be an integral part of computing device 702 (e.g., a touchscreen, a built-in microphone). User interface 712 may support interaction between an embodiment and one or more users. User interface 712 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through an input data interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which computing device 702 is incorporated, such as in a tablet-type personal computer. In addition, computers such as computing device 702 may also include other peripheral output devices such as speakers and printers, which may be connected through an output peripheral interface or the like.

One or more application programming interface (API) calls may be made between input/output devices 718 and computing device 702, based on input received from user interface 712 and/or from network(s) 716. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system including one or more computing devices 702 in other embodiments, depending on their detachability from processor(s) 706. Other computerized devices and/or systems not shown in FIG. 7 may interact in technological ways with computing device 702 or with another system using one or more connections to network 716 via network interface 714, which may include network interface equipment, such as a physical network interface controller (NIC) or a virtual network interface (VIF).

Computing device 702 includes at least one logical processor 706. The at least one logical processor 706 may include circuitry and transistors configured to execute instructions from memory (e.g., memory 704). For example, the at least one logical processor 706 may include one or more central processing units (CPUs), arithmetic logic units (ALUs), Floating Point Units (FPUs), and/or Graphics Processing Units (GPUs). Computing device 702, like other suitable devices, also includes one or more computer-readable storage media, which may include, but are not limited to, memory 704 and data storage 708. In some embodiments, memory 704 and data storage 708 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, configured medium 720 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 702, making its content accessible for interaction with and use by processor(s) 706. The removable configured medium 720 is an example of a computer-readable storage medium. Some other examples of computer-readable storage media include built-in random-access memory (RAM), read-only memory (ROM), hard disks, and other memory storage devices which are not readily removable by users (e.g., memory 704).

Configured medium 720 may be configured with instructions (e.g., binary instructions) that are executable by processor 706; "executable" is used in a broad sense herein to include machine code, interpretable code, bytecode, compiled code, and/or any other code that is configured to run on a machine, including a physical machine or a virtualized computing instance (e.g., a virtual machine or a container). Configured medium 720 may also be configured with data, which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 710 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 706, memory 704, data storage 708, and screens/displays, operating environment 700 may also include other hardware 710, such as batteries, buses, power supplies, wired and wireless network interface cards, for instance. The nouns "screen" and "display" are used interchangeably herein. A display may include one or more touch screens, screens responsive to input from a pen or tablet, or screens that operate solely for output. In some embodiment, other input/output devices 718 such as human input data/output devices (screen, keyboard, mouse, tablet, microphone, speaker, motion sensor, etc.) will be present in operable communication with one or more processors 706 and memory 704.

In some embodiments, the system includes multiple computing devices 702 connected by network(s) 716. Networking interface equipment can provide access to network(s) 716, using components (which may be part of network interface 714) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

Computing device 702 may operate in a networked or cloud-computing environment using logical connections to one or more remote devices (e.g., using network(s) 716), such as a remote computer (e.g., another computing device 702). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 702 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one including an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other methods of establishing a communications link between the computers may be used.

Computing device 702 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

Data storage 708 or system memory 704 includes computer storage media in the form of volatile and/or nonvolatile memory such as ROM and RAM. A basic input/output system (BIOS), containing the basic routines that help to transfer information between elements within a computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 708 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, as illustrated in FIG. 7, operating environment 700 may include at least one computing device 702, the at least one computing device 702 including at least one processor 706, at least one memory 704, at least one data storage 708, and/or any other component discussed above with respect to FIG. 7.

Figure 8:
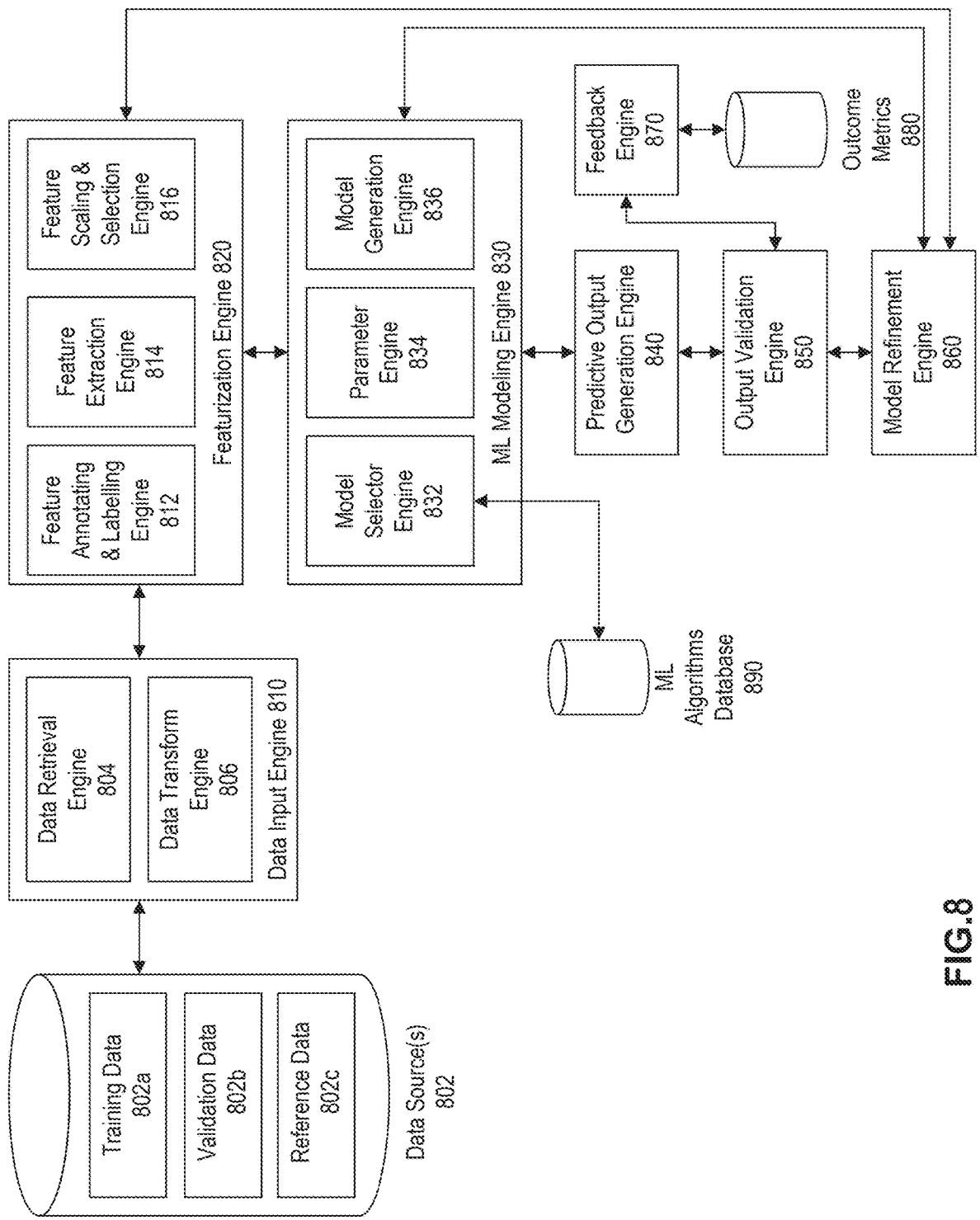
FIG. 8 depicts a block diagram of an example of a machine learning platform for implementing various aspects of the disclosed embodiments, according to some embodiments of the present disclosure.

FIG. 8 is a block diagram illustrating an example of a machine learning platform for implementing various aspects of this disclosure, according to some embodiments of the present disclosure.

System 800 may include data input engine 810 that can further include data retrieval engine 804 and data transform engine 806. Data retrieval engine 804 may be configured to access, interpret, request, or receive data, which may be adjusted, reformatted, or changed (e.g., to be interpretable by other engines, such as data input engine 810). For example, data retrieval engine 804 may request data from a remote source using an API. Data input engine 810 may be configured to access, interpret, request, format, re-format, or receive input data from data source(s) 802. For example, data input engine 810 may be configured to use data transform engine 806 to execute a re-configuration or other change to data, such as a data dimension reduction. Data source(s) 802 may exist at one or more memories 704 and/or data storages 708. Data source(s) 802 may be associated with a single entity (e.g., organization) or with multiple entities. Data source(s) 802 may include one or more of training data 802*a* (e.g., input data to feed into a machine learning model as part of one or more training processes), validation data 802*b* (e.g., data against which at least one processor may compare model output with, such as to determine model output quality), and/or reference data 802*c* (e.g., ground truth labels used to validate machine learning models). Data input engine 810 can be implemented using at least one computing device (e.g., computing device 702). For example, data from data source(s) 802 can be obtained through one or more I/O devices and/or network interfaces. Further, the data may be stored (e.g., during execution of one or more operations) in a suitable storage or system memory. Data input engine 810 may also be configured to interact with data storage 708, which may be implemented on a computing device that stores data in storage or system memory. System 800 may include featurization engine 820. Featurization engine 820 may include feature annotating & labeling engine 812 (e.g., configured to annotate or label features from a model or data, which may be extracted by feature extraction engine 814), feature extraction engine 814 (e.g., configured to extract one or more features from a model or data), and/or feature scaling and selection engine 816 (e.g., configured to scale and select features based on certain criteria). Feature scaling and selection engine 816 may be configured to determine, select, limit, constrain, concatenate, or define features (e.g., AI features) for use with AI models. Similar to data input engine 810, featurization engine 820 can be implemented on a computing device. System 800 may also include machine learning (ML) modeling engine 830, which may be configured to execute one or more operations on a machine learning model (e.g., model training, model re-configuration, model validation, model testing), such as those described in the processes described herein. For example, ML modeling engine 830 may execute an operation to train a machine learning model, such as adding, removing, or modifying a model parameter. Training of a machine learning model may be supervised, semi-supervised, or unsupervised. Training of a machine learning model may include multiple epochs, or passes of data (e.g., training data 802*a*) through a machine learning model process (e.g., a training process). Different epochs may have different degrees of supervision (e.g., supervised, semi-supervised, or unsupervised). Data input to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 830 may include model selector engine 832 (e.g., configured to select a model from among a plurality of models, such as based on input data), parameter engine 834 (e.g., configured to add, remove, and/or change one or more parameters of a model), and/or model generation engine 836 (e.g., configured to generate one or more machine learning models, such as according to model input data, model output data, comparison data, and/or validation data). Further, model selector engine 832 or model generation engine 836 may be configured to receive input and/or transmit output to ML algorithms database 890 (e.g., a data storage 708). Similarly, featurization engine 820 can utilize storage or system memory for storing data and can utilize one or more I/O devices or network interfaces for transmitting or receiving data. ML algorithms database 890 (or other data storage 708) may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-Trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 800 can further include predictive output generation engine 840, output validation engine 850 (e.g., configured to apply validation data to machine learning model output), feedback engine 870 (e.g., configured to apply feedback from a user and/or machine to a model), and model refinement engine 860 (e.g., configured to update or re-configure a model). Feedback engine 870 may receive input and/or transmit output (e.g., output from a trained, partially trained, or untrained model) to outcome metrics database 880. Outcome metrics database 880 may be configured to store output from one or more models and may also be configured to associate output with one or more models. Outcome metrics database 880, or other device (e.g., model refinement engine 860 or feedback engine 870), may be configured to correlate output, detect trends in output data, and/or infer a change to input or model parameters to cause a particular model output or type of model output. Model refinement engine 860 may receive output from predictive output generation engine 840 or output validation engine 850. Model refinement engine 860 may transmit the received output to featurization engine 820 or ML modeling engine 830 in one or more iterative cycles.

Any or each engine of system 800 may be a module (e.g., a program module), which may be a packaged functional hardware unit designed for use with other components or a part of a program that performs a particular function (e.g., of related functions). Any or each of these modules may be implemented using a computing device. The functionality of system 800 may be split across multiple computing devices to allow for distributed processing of the data, which may improve output speed and reduce computational load on individual devices. System 800 may use load-balancing to maintain a stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 800 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Embodiments of the present disclosure may include a system for text sanitization. The system may include obtaining a first language model, training data including personally identifiable information (PII), and ground truth labels corresponding to the training data, the ground truth labels identifying the PII included in the training data. A first language model may be trained to sanitize text data using the training data and the ground truth labels. Further, a second language model may also be trained to sanitize text data using the first language model. The second language model can be configured to be less resource-intensive than the first language model. Embodiments may include obtaining input text including PII and private PII. Some embodiments include generating sanitized output text data using the second language model and the input text data.

Generating the sanitized output data may include generating a version of the input text data with a portion of the private PII included in the input text data redacted, tagged, masked, replaced, anonymized, obfuscated, or encrypted.

The system may also include tagging the portion of the private PII included in the input text as private PII and tagging the portion of the public PII included in the input text as public PII. Further, generating the sanitized output data may include redacting the portion of the private PII based on the private PII tags.

The public and private PII may include one or more of names, dates of birth, identification numbers, contact information, account information, credentials, medical information, employment information, education information, legal information, biometric data, identity-associated device information, or location data.

The second language model may require less memory than the first language model, where the second language model may include fewer parameters than the first language model or require fewer operations to generate an output than the first language model.

The second language model may be trained by generating labeled second training data using unlabeled second training data and the first language model where the second language model is trained, at least in part, using the labeled second training data. For example, the second language model may be trained by fine-tuning the first language model using PII identification task-specific data. Further, the second language model may be trained by fine-tuning the first language model through reinforcement learning.

Obtaining the input text data may include retrieving the input text data from a storage location, receiving the input text data from another system, or receiving the input text data from a user interface.

Embodiments of the present disclosure may include a computer-implemented method for text sanitization. The computer-implemented method may include obtaining a first language model trained to sanitize text data, the first language model trained using training data including personally identifiable information (PII) and ground truth labels corresponding to the training data. A second language model may be trained using the first language model, to sanitize text data. The second language model may be less resource-intensive than the first language model. Embodiments may include obtaining input text including PII and private PII. Some embodiments include generating sanitized output text data using the second language model and the input text data.

Embodiments of the present disclosure may include a non-transitory, computer-readable medium that may contain instructions that when executed by at least one processor of a system, cause the system to perform operations for text sanitization. The operations may include obtaining a first language model, training data including personally identifiable information (PII), and ground truth labels corresponding to the training data, the ground truth labels identifying the PII included in the training data. The operations may also include training a first language model to sanitize text data using the training data and the ground truth labels. The operations can also include training a second language model using the first language model, to sanitize text data. The second language model may be configured to be less resource-intensive than the first language model. The operations may include obtaining input text including PII and private PII. Further, the operations may include generating sanitized output data using the second language model and the input text data, the sanitized output including modified versions of at least a portion of the PII.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

This disclosure was described in the general context of customized hardware capable of executing customized pre-loaded instructions such as, e.g., computer-executable instructions for performing program modules. It is not understood that program modules may include one or more of routines, programs, objects, variables, commands, scripts, functions, applications, components, data structures, and so forth, which may perform particular tasks or implement particular abstract data types. Further, the disclosed methods may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operations to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input text data (e.g., training input text data), which allows the model to improve its abilities. For example, a dataset may be input to a model, which may produce an output based on the dataset and the configuration of the model itself. Then, based on additional information (e.g., an additional input text dataset, validation data, reference data, feedback data), the model may deduce and automatically electronically implement a change to its configuration that will lead to an improved output.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system for text sanitization, the system comprising:
one or more processors; and
one or more storage devices storing instructions that, when executed by the one or more processors, cause the system to perform operations comprising:
obtaining a first language model, training data including personally identifiable information (PII), and ground truth labels corresponding to the training data, the ground truth labels identifying PII included in the training data;
training the first language model to sanitize data using the training data and the ground truth labels;
training a second language model, using the first language model, to sanitize data, the second language model being less resource-intensive than the first language model;
obtaining input data including public PII and private PII; and
generating sanitized output data using the second language model and the input data.

2. The system of claim 1, wherein generating the sanitized output data comprises at least one of redacting, tagging, replacing, anonymizing, obfuscating, or encrypting a portion of the private PII in the input data.

3. The system of claim 2, wherein:
the portion of the private PII included in the input data is tagged as private PII;
a portion of the public PII included in the input data is tagged as public PII; and
generating the sanitized output data further comprises redacting the portion of the private PII based on private PII tags.

4. The system of claim 1, wherein generating the sanitized output data comprises using the second language model to substitute PII in the input data with markup language tags, the markup language tags comprising a specific formatting and a PII category.

5. The system of claim 1, wherein:
the second language model requires less memory than the first language model; and
the second language model includes fewer parameters than the first language model or requires fewer operations to generate an output than the first language model.

6. The system of claim 1, wherein training the second language model comprises:
generating labeled second training data using unlabeled second training data and the first language model; and
the second language model is trained, at least in part, using the labeled second training data.

7. The system of claim 1, wherein training the first language model comprises:
fine-tuning the first language model using:
PII identification task-specific data; or
reinforcement learning.

8. The system of claim 1, wherein obtaining the input data comprises at least one of:
retrieving the input data from a storage location;
receiving the input data from another system; or
receiving the input data via an interface.

9. A computer-implemented method for text sanitization, the method comprising:
configuring a first language model to sanitize text data, the first language model being trained using training data including personally identifiable information (PII) and ground truth labels corresponding to the training data;
training a second language model, using the first language model, to sanitize data, the second language model being less resource-intensive than the first language model;
obtaining input data including PII; and
generating sanitized output data using the second language model and the input data.

10. The method of claim 9, wherein:
the PII comprises public PII and private PII;
the input data comprises input text data; and
generating the sanitized output data comprises generating a version of the input data with a portion of the private PII included in the input text data redacted.

11. The method of claim 10, wherein:
the portion of the private PII included in the input text data is tagged as private PII; and
a portion of the public PII included in the input text data is tagged as public PII.

12. The method of claim 9, wherein:
the input data comprises audio data;
the method comprises to transcribing the audio data; and
generating the sanitized output data comprises using the second language model to include markup language tags in the transcribed audio data, the markup language tags comprising a PII category, the PII category specifying a category selected from individual, URL, phone number, email address, physical address, account number, password, or API key.

13. The method of claim 9, wherein the second language model requires less memory than the first language model.

14. The method of claim 9, wherein training the second language model comprises:
generating labeled second training data using unlabeled second training data and the first language model; and
the second language model is trained, at least in part, using the labeled second training data.

15. The method of claim 9, wherein obtaining the first language model comprises:
receiving the first language model; and
fine-tuning the first language model using PII identification task-specific data.

16. The method of claim 9, wherein obtaining the input data comprises receiving the input data via an application programming interface.

17. A non-transitory, computer-readable medium containing instructions that, when executed by at least one processor of a system, cause the system to perform operations comprising:
obtaining a first language model, training data, and ground truth labels corresponding to the training data, the ground truth labels identifying personally identifiable information (PII) included in the training data;
training a second language model, using the first language model, to sanitize the training data, the second language model being less resource-intensive than the first language model;
receiving input data including public PII and private PII; and
generating sanitized output data using the second language model and the input data, the sanitized output including modified versions of at least a portion of the PII.

18. The non-transitory, computer-readable medium of claim 17, wherein generating the sanitized output data comprises:
using the second language model to add PII tags in the input data, the PII tags comprising a specific formatting; and
generating the sanitized output by redacting, tagging, masking, replacing, anonymizing, obfuscating, encrypting, data associated with the specific formatting.

19. The non-transitory, computer-readable medium of claim 17, wherein the second language model includes fewer parameters than the first language model.

20. The non-transitory, computer-readable medium of claim 17, wherein training the second language model comprises generating labeled second training data using unlabeled second training data and the first language model.

* * * * *